United States Patent [19]

Fast

[11] Patent Number: 4,917,342

[45] Date of Patent: Apr. 17, 1990

[54] STAND-UP SIGN HOLDER

[76] Inventor: Jacob Fast, 7561 NW. 9th St., Plantation, Fla. 33317

[21] Appl. No.: 328,499

[22] Filed: Mar. 24, 1989

[51] Int. Cl.4 .............................................. F16M 11/00

[52] U.S. Cl. .................................... 248/174; 206/448; 206/459; 248/459

[58] Field of Search ....................... 40/124.4, 124, 642, 40/611; 248/174, 459; 206/44 B, 459; D6/310, 311, 312, 313, 314, 449, 466

[56] References Cited

U.S. PATENT DOCUMENTS

| | | | |
|---|---|---|---|
| 1,006,334 | 10/1911 | Wright | 40/124.4 |
| 2,252,571 | 8/1941 | Kohn | 248/459 |
| 2,651,421 | 9/1953 | King | 40/124.4 X |
| 3,292,796 | 12/1966 | Paige | 248/174 X |
| 3,738,604 | 6/1973 | Howlett et al. | 248/459 |
| 4,190,151 | 2/1980 | Russell | 206/459 X |
| 4,387,520 | 6/1983 | Ahrens | 40/124.4 X |
| 4,611,865 | 9/1986 | Daws | D6/314 X |

*Primary Examiner*—Ramon O. Ramirez
*Attorney, Agent, or Firm*—Fleit, Jacobson, Cohn, Price, Holman & Stern

[57] ABSTRACT

A stand-up label or sign holder for use in supermarkets or bakeries is made of plastic sheet material and has a base panel at one end, a label or sign holder panel at its opposite end and an elongate stem connecting the panels. The base panel can be used to support the holder by folding the base panel at right angles to the stem so that the holder stands on the base panel with the stem extending upwardly toward the holder panel. The holder panel can be bent back toward the base panel to stabilize the holder. Also, the stem has lengthwise ribbing which promotes transverse bowing of the stem so as to resist lengthwise twisting or bending. The label or sign holder panel has tabs for retaining a sign or label. If the holder is made of transparent plastic, the sign or label is visible from both sides of the holder panel.

12 Claims, 1 Drawing Sheet

STAND-UP SIGN HOLDER

BACKGROUND AND SUMMARY OF THE INVENTION

This invention relates to a stand-up sign or label holder which can be used for example, in supermarket bakeries and the like to display product information, prices and the like.

Temporary or semi-permanent labelling of goods on supermarket or bakery shelves or racks is oftentimes required, and the invention provides a convenient form of sign or label holder which can be supported on a shelf or rack to display a sign or label in a prominent position. Also, in a preferred form of the invention, the holder is so constructed as to enable a sign or label supported thereby to be read from opposite sides, so that if used at a supermarket checkout for example, the sign or label can be seen both by the customer and the checkout clerk.

In accordance with the invention a sign or label holder of the described comprises a card or sheet of flexible material, such as a plastic sheet, which is preferably transparent, and which has a base panel at one end,a sign or label holding panel at the opposite end, an elongate stem connecting the panel, and a transverse fold line between the base panel and stem whereby the stem can be folded substantially perpendicular to the base panel to form an upright support for the sign or label holding panel when the holder is supported on the base panel. There may also be a second transverse fold line between the sign or label holding panel and the stem, so that the holding panel can be angled rearwardly somewhat when the holder is supported on the base panel to generally improve the balance and stability of the holder.

In a preferred form of the invention, the stem may have longitudinal ribbing which promotes transverse bowing of the stem, thereby reinforcing the stem against lengthwise bending or twisting and thereby further stabilizing the holder. The holding panel may have cutouts defining tabs for retaining a label or sign thereon.

The holder can be die-cut in plastic sheet thereby providing a relatively low cost item which can be stored flat and kept in quantity for folding into a stand-up configuration as required. If made from transparent or translucent sheet, the sign or label will be visible from opposite sides of the holding panel.

Additional features and advantages of the invention will become apparent from the ensuing description and claims read in conjunction with the attached drawings.

DESCRIPTION OF THE PREFERRED EMBODIMENT

A label holder 10 in accordance with the invention comprises a plastic sheet which is preferably transparent and which is die cut to shape to provide a base panel 12 at one end of the sheet, a label holder panel 14 at the opposite end of the sheet and an elongate stem portion 16 connecting the respective panels.

Figure 1:
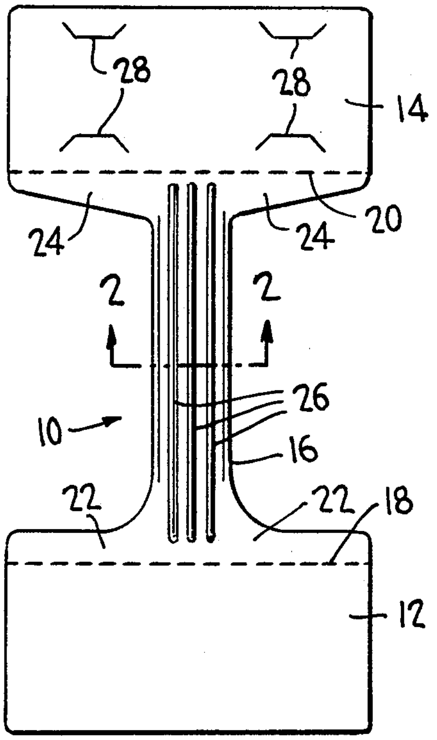
FIG. 1 is a plan view of a label holder in accordance with the invention prior to folding.
Figure 2:
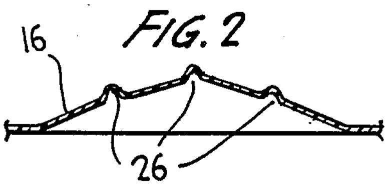
FIG. 2 is a sectional view on line 2—2 of FIG. 1.
Figure 4:
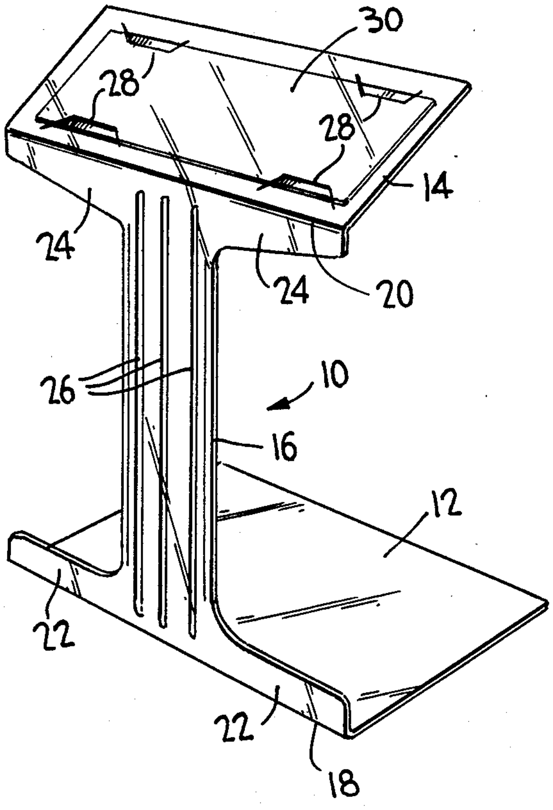
FIG. 4 is a front perspective view of the holder when folded.
Figure 5:
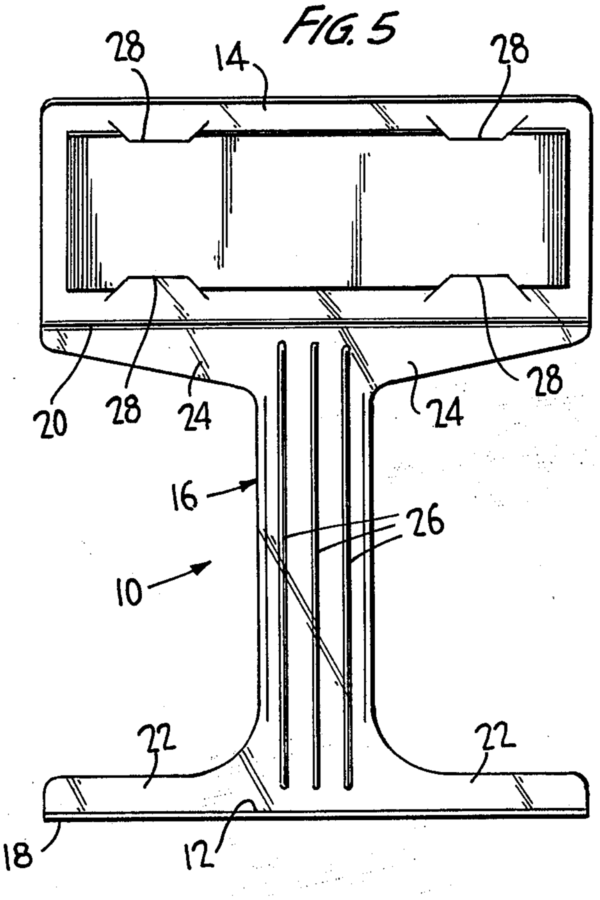
FIG. 5 is a front elevational view of the holder when folded.

A first transverse fold line 18 is provided between the base panel and the stem portion and a second transverse fold line 20 is provided between the label holder panel and the stem portion. The stem portion has flange sections 22, 24 at its opposite ends which effectively merge with the panels 12 and 14. Also, the stem portion is provided with lengthwise reinforcing ribs 26 which promote transverse bowing of the stem portion as shown in FIG. 2, which resists lengthwise twisting or bending of the stem portion. The label holder panel 14 is provided with cut-outs defining label holding tabs 28 for holding a label 30 as shown in FIGS. 4 and 5. The base panel may be somewhat larger in area than the label holder panel, so as to stabilize the holder in the standing position.

Figure 3:
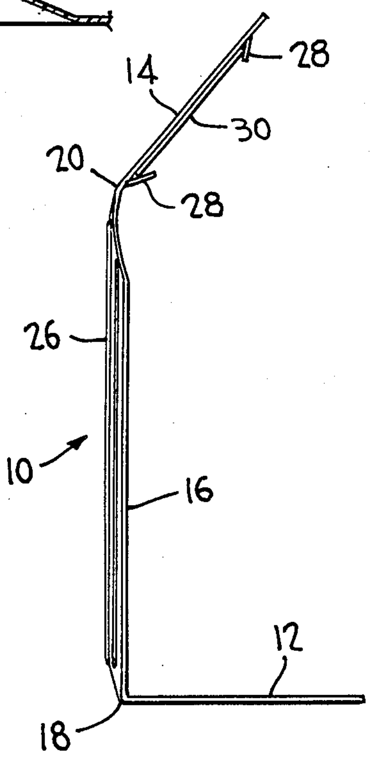
FIG. 3 is a somewhat enlarged side elevational view of the holder when folded.

To stand the holder, the base panel is folded perpendicularly to the stem about line 18,as shown in FIGS. 3 and 5, and the label holder panel is preferably folded back somewhat about line 20 to further stabilize the holder when standing on the base panel.

As previously noted, the holder can conveniently be used in supermarkets, bakeries and the like as a stand-up holder which can display a label or sign so that it is visible from opposite sides of the holder.

I claim:

1. A holder for labels, signs and the like comprising a sheet of foldable material having a base panel at one of the sheet, a label or sign holding panel at an opposite end of the sheet, an elongate stem connecting said panels, a transverse fold line between the base panel and the stem whereby, when the base panel is folded about said fold line substantially perpendicularly to the stem, the holder can stand on the base panel with the stem extending upwardly toward the label or sign holding panel and a further transverse fold line between the label or sign holding panel for bending the panel back toward the base panel.

2. The invention as defined in claim 1 wherein the holding panel has cut-outs defining tabs for holding a label or sign.

3. The invention as defined in claim 1 wherein said sheet is a sheet of plastic which is at least translucent.

4. The invention define in claim 1 wherein the base panel is somewhat larger in area than the holding panel.

5. The invention as defined in claim 1 wherein the base panel is a substantially planar rectangular panel.

6. The invention defined in claim 5 wherein the holding panel is a substantially planar rectangular panel somewhat smaller in area than the base panel.

7. A stand-up label and sign holder of sheet material comprising a base panel, a stem extending upwardly substantially at a right angle from one edge of the base panel, and a holding panel for a label or sign extending from an upper end of the stem, the holding panel being inclined rearwardly from the stem and extending therefrom in the same direction as the base panel, and fold lines between the stem and the respective panels, the holder being folded about said lines.

8. The invention as defined in claim 7 including a sign or label secured face-to-face on the holder panel.

9. The invention defined in claim 8 wherein the holder panel includes tabs which embrace respective edges of the sign or label to secure same on the holder panel.

10. A stand-up label and sign holder of sheet material comprising a base panel, a stem extending upwardly substantially at a right angle from one edge of the base panel, and a holding panel for a label or sign extending from an upper end of the stem, the holding panel being inclined rearwardly from the stem and extending therefrom in the same direction as the base panel, said stem having lengthwise ribbing promoting transverse bowing of the stem.

11. A holder for labels, signs and the like comprising a sheet of foldable material having a base panel at one end of the sheet, a label or sign holding panel at an opposite end of the sheet, an elongate stem connecting sand panels and a transverse fold line between the base panel and the stem whereby, when the base panel is folded about said fold line substantially perpendicularly to the stem, the holder can stand on the base panel with the stem extending upwardly toward the label or sign holding panel, said stem having outwardly extending flanges at opposite ends thereof merging with the respective panels.

12. A holder for labels, signs and the like comprising a sheet of foldable material having a base panel at one end of the sheet, a label or sign holding panel at an opposite end of the sheet, an elongate stem connecting sand panels and a transverse fold line between the base panel and the stem whereby, when the base panel is folded about said fold line substantially perpendicularly to the stem, the holder can stand on the base panel with the stem extending upwardly toward the label or sign holding panel, said stem having lengthwise ribbing for promoting transverse bowing of the stem.

* * * * *